United States Patent [19]

Kurosaki

[11] 3,942,250
[45] Mar. 9, 1976

[54] ELECTRIC HAND NIBBLING MACHINE
[75] Inventor: Kiichiro Kurosaki, Tokyo, Japan
[73] Assignee: Sanwa Seiki Kabushiki Kaisha, Tokyo, Japan
[22] Filed: Dec. 16, 1974
[21] Appl. No.: 533,357

[30] Foreign Application Priority Data
Dec. 21, 1973 Japan.............................. 48-145730

[52] U.S. Cl. ...................... 30/241; 30/242; 83/916
[51] Int. Cl.² .......................................... B26B 15/00
[58] Field of Search ........ 30/228, 241, 242; 83/621, 83/670, 916

[56] References Cited
UNITED STATES PATENTS

| 2,632,950 | 3/1953 | Hedstrom | 30/241 |
| 3,412,466 | 11/1968 | Kurosaki | 30/241 X |
| 3,847,049 | 11/1974 | Bitzel | 30/241 X |

Primary Examiner—Harold D. Whitehead
Assistant Examiner—J. C. Peters
Attorney, Agent, or Firm—Woodhams, Blanchard and Flynn

[57] ABSTRACT

An electric hand nibbling machine having means for connecting a movable blade member with a rotary driving means transmitting a force from said rotary driving means in the axial direction of said movable blade member while allowing rotation of said movable blade member on its axis and having a sufficient clearance between the fixtures of the movable blade member and a confronting fixed blade member for free and exact operation for an angular material to be cut.

4 Claims, 6 Drawing Figures

ELECTRIC HAND NIBBLING MACHINE

This invention relates to an electric hand nibbling machine for shearing sheet iron, synthetic resin sheet or the like by nibbling operation, and more particularly to an electric hand nibbling machine appropriately adapted to cut a so-called keystone-plate or deck-plate used as a material for a ceiling or floor.

As shown in FIGS. 5A and 5B, one type of nibbling machine effects shearing of a material in a pushing stroke of its movable blade member $b$ which is adapted to move reciprocatively relative to its fixed blade member $f$ (as shown in FIG. 5A), while another type of nibbling machine effects shearing of a material in a pulling stroke of its movable blade member $b$ which is also adapted to move reciprocatively relative to its fixed blade member $f$ (as shown in FIG. 5B).

In either type of nibbling machine, shearing is effected the moment a cutting edge $b1$ of the movable blade member $b$ come across an edge $f1$ of the fixed blade member $f$ disposed in a position abuttable against said cutting edge $b1$ of the movable blade member $b$.

A projecting pin $g$ is provided on a lower end of the movable blade member (in case of FIG. 5A) or an upper end of the movable blade member (in case of FIG. 5B) to form a recessed portion in cooperation with the lower or upper end surface of the movable blade member $b$ for receiving the material to be cut therein, determining a nibbling distance or pitch of one nibbling operation. Since the tip end of the material to be cut abuts against said pin $g$ or the end wall of said recessed portion, the nibbling pitch per one nibbling operation is determined by the difference in diameters between said movable blade member $b$ and said pin $g$.

Such a pin $g$ may be provided centrally on the upper or lower surface of the movable blade member $b$. This structure has an advantage that the shearing direction can be easily changed without changing the direction of the machine body since the shearing can be effected in any direction in relation with the movable blade member $b$, but it has the serious disadvantage that the pin $g$ must be formed comparatively thin in relation with the diameter of the movable blade member $b$ and subjected to a shock by nibbling operation in an unsupported position. In this connection, it is to be noted that the pin $g$ bumps against the tip end of the material and is subjected to a shock in the lateral direction every nibbling operation. Further, a bending stress is applied to the pin $g$ in case the nibbling machine is of a type as shown in FIG. 5B.

Because of this serious disadvantage of the structure, it is recommended to dispose the pin $g$ eccentrically on the lower or upper end of the movable blade member $b$ though this eccentric pin disposition has a drawback that the shearing direction is restricted due to its eccentric arrangement. With this arrangement, the diameter of the pin $g$ may be made larger as compared with that of the pin which is provided centrally and the pin $g$ may be slidably supported at the back thereof by its support fixture so that it can well resist a bending stress. Due to this merit, this eccentric arrangement is widely employed in a nibbling machine.

However, there still remains a drawback that the shearing direction can not be converted without changing the direction of the machine body, to wit, that the shearing can not be effected in a direction other than the forward direction of the machine body. Stated illustratively, the nibbling machine of this structure can not be operated when the shearing is required to be effected laterally or backwardly with reference to the front of the machine body, according to the size or situation of the material set and the machine body can not be freely turned to a desired direction in a corner etc. because the bulky head portion of the machine strikes against walls.

Especially in the shearing of a keystone plate or deck plate, etc., which are in great demand as a material for a ceiling or floor, the shearing operation is required to be conducted substantially at a right angle to the direction of the machine body as shown in FIG. 4 and the nibbling machine as mentioned above can not meet this requirement. Further for shearing the keystone plate or the deck plate, there is preferably provided a sufficient clearance, in connection with the blade members, for conforming the machine with the angle of the keystone plate or deck plate without striking the corners thereof to snugly receive the angular material between the blade members for easy and right operation of the machine.

It is therefore an object of the present invention to provide a nibbling machine having a sufficient strength against a shock given by the nibbling operation and capable of readily effecting shearing in a direction desired, in a corner or even in a circular contour, operating the machine in the most natural and convenient manner. It is another object of the present invention to provide a nibbling machine as mentioned above which is specifically adapted to shear a keystone plate, a deck plate or the like.

According to the present invention, there is provided in a hand nibbling machine having a rotary driving means, a piston connected to said rotary driving means, a cylindrical movable blade member with a cutting edge and fixed to said piston, a fixed blade member having a cutting edge disposed in an abuttable relation to the cutting edge of the movable blade member and connected, through a support member, to a piston holding member fitted around said piston, the improvement comprising said cylindrical movable blade member is formed with a recessed portion for receiving a material to be cut therein and is provided with the cutting edge at one of the vertical ends of said recessed portion; means for connecting said piston with said rotary driving means transmitting a force from said rotary driving means in the axial direction while allowing rotation of said piston on its axis; and said piston holding member and said fixed blade member tapered at their respective end portions facing each other, forming a clearance for allowing free operation of the machine and defining a sectoral shape expanding towards the outside of the support member which is provided in the rear side of said movable blade member with reference to the cutting direction of the machine and in parallel with said movable blade member and has a thickness the same as or less than the diameter of said movable blade member.

The invention will be better understood from the following description taken in connection with the accompanying drawings in which.

Figure 1:
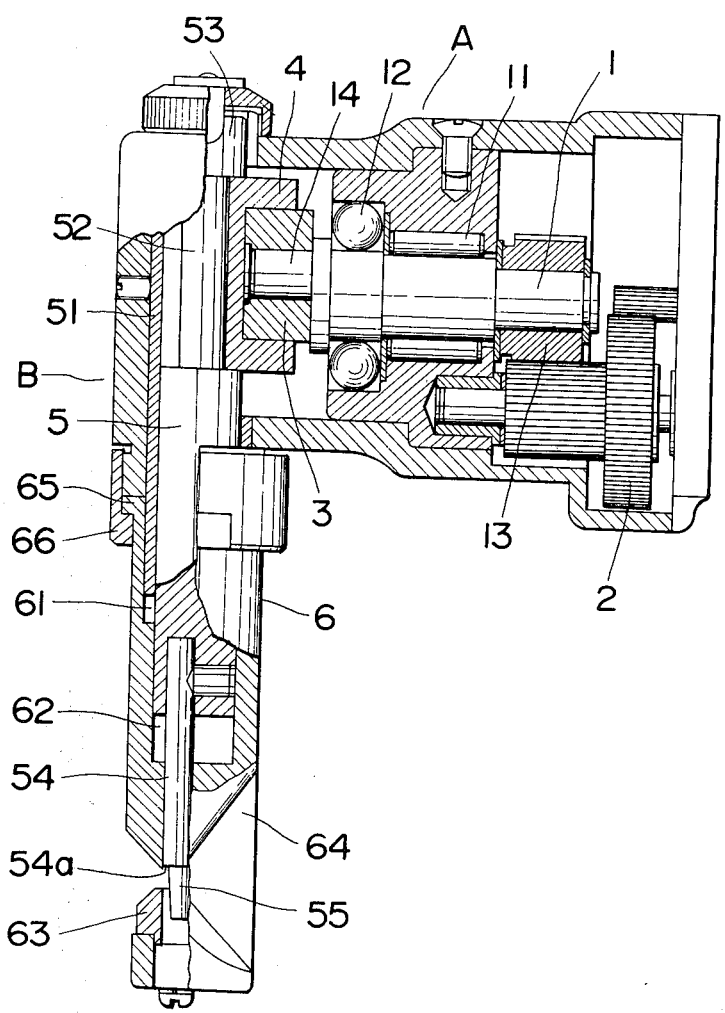
FIG. 1 is a partly sectioned side elevation of a nibbling machine according to the present invention.

Referring now to FIG. 1, there is shown a head portion of a nibbling machine according to the present invention which includes a laterally extending portion A for housing a driving means and an axially or vertically extending portion B for housing a piston connected with a forward end of said driving means housing portion A.

Centrally in said portion A is rotatably mounted a crank shaft 1 through bearings 11 and 12. An eccentric shaft 14 is provided eccentrically at the forward end of said crank shaft 1 and a crank gear 13 is fixed to the rearward end of said crank shaft 1. Said crank gear 13 is meshed with an intermediate gear 2 which is in turn meshed with a pinion gear of a rotary driving means or a motor to rotate the crank shaft 1.

Figure 2:
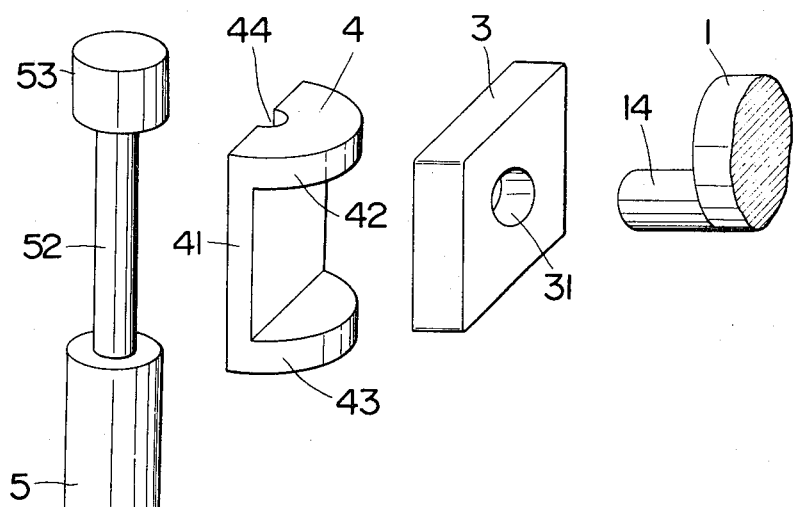
FIG. 2 is an exploded view of one form of means for connecting a piston with a rotary driving means according to the present invention.

The eccentric shaft 14 is rotatably fitted in a slide plate 3 as shown in FIG. 2.

Said slide plate 3 is formed in a square or rectangular shape and it has a central hole 31 for receiving the eccentric shaft 14 and it has slide faces at the upper and lower ends thereof. The thus formed slide plate 3 is in turn fitted in a holder 4 so as to move horizontally.

Said holder 4 has an upper wing portion 42 at its upper end and a lower wing portion 43 at its lower end. Said slide plate 3 is fitted in a space defined between the sliding guides of said upper and lower wing portions 42 and 43.

Said holder 4 further comprises a vertical plate portion 41 which has a vertically extending hemicyclic groove 44 formed centrally on the side opposite to the side having said wing portions 42 and 43. A thin rod 52 as will be mentioned later is adapted to be snugly fitted in said hemicyclic groove 44. The eccentric shaft 14, slide plate 3 and specifically formed holder 4 cooperate with the thin rod 52 to constitute a means for connecting the piston with said rotary driving means so as to transmit a force from said rotary driving means in the axial direction, allowing rotation of said piston on its axis.

Figure 3:
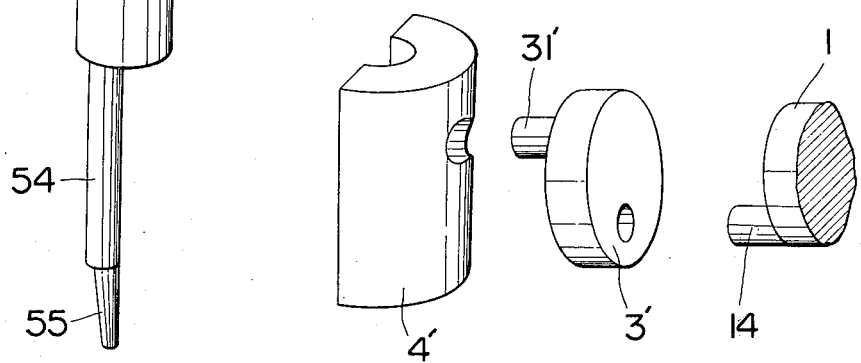
FIG. 3 is a similar exploded view of another form of means for connecting a piston with a rotary driving means.

This means, however, is not restricted to the structure formed of the combination as mentioned above. For example, a member similar to the slide plate 3 may be fitted directly to the thin rod or the eccentric shaft 14 may be connected to an eccentric rotary plate 3' with an eccentric pin 31' which si rotatably connected to a holder 4' as shown in FIG. 3.

This means may be constructed in a further different way so long as it functions to transmit an eccentric rotation from the crank shaft 1 in form of axial or vertical movement of the piston 5, allowing the piston 5 to rotate freely on its axis.

The piston housing portion B has a cylinder 51 centrally mounted therein. In said cylinder 51 there is mounted the piston 5 so as to reciprocatively move up and down. Said piston 5 is formed to be cylindrical and is provided, centrally at its upper surface, with the vertically extending thin rod 52. To an upper end of said thin rod 52 is fixed a disc member 53 substantially of the same diameter as the piston 5.

A cylindrical blade member 54 is provided on the lower surface of the piston 5 at an eccentric position and it is provided with a cutting edge 54a at its lower end which effects shearing operation in cooperation with a cutting edge of a fixed blade member 63 disposed in an abuttable relation to said edge 54a of the movable blade member 54.

The movable blade member 54 has further a pin 55 eccentrically provided at its lower end surface to extend vertically, forming a recessed portion to receive the material to be cut in cooperation with the lower end surface of the movable blade member 54 which is equipped with the cutting edge and determining the nibbling distance per one nibbling operation. Said pin 55 is so disposed as to form an inscribed circle to said blade member 54 in a cross sectional view.

A piston holding member 6 is rotatably fitted, at its upper portion, around the lower portion of the cylinder 51. Said piston holding member 6 includes an upper cylinder portion 61 fitting around the cylinder 51 and having an inner diameter substantially equal to the outer diameter of the cylinder 51, an intermediate cylinder portion 62 fitting around the piston 5 and having an inner diameter equal to the outer diameter of the piston 5, and a lower cylinder portion fitting around the movable blade member 54 and having an inner diameter equal to the outer diameter of said blade member 54.

In the thus assembled structure, said blade member 54 is not in a concentric relation with the piston 5 and accordingly it is eccentric with the respective cylinder portions.

To the lower end of the piston holding member 6 is connected the fixed blade member 63 through a support member 64 which is provided in the rear side of said movable blade member 54 with reference to the cutting direction of the machine and in parallel with said blade member 54 and has a thickness the same as or less than the diameter of said blade member 54. Said fixed blade member 63 is provided with a vertical hole for receiving the confronting movable blade member 54 forming the cutting edge of the fixed blade member 63, whereby the shearing is effected the moment the edge 54a of the movable blade member 54 enters said hole or comes across the edge of the fixed blade member.

In this embodiment, the piston holding member 6 and the fixed blade member 63 are tapered at their respective end portions opposite to each other, defining the support member 64 into a sectoral shape expanding towards the outside thereof to easily and freely operate the machine for shearing an angular material such as a keystone plate etc. Further, the support member 64 may be formed long enough to separate the piston holding member 6 from the fixed blade member 63 so as to fit the purpose.

The piston holding member 6 is provided with a flange 65 around the periphery of the upper end portion thereof for mounting said piston holding member 6 on the machine body. Said flange 65 is adapted to be fastened against the machine body with a ring 66 which is fitted around the periphery of said piston holding member 6 when said member 6 is required to be fixed to the machine body.

The flange 65 is formed with a plurality of concavities at appropriate intervals and the machine body has a pin engageable with one of the concavities. With this construction, the piston holding member 6 can be rotated freely by loosening said ring 66 and can be held firmly avoiding needless movement by bringing the pin into engagement with one of the concavities and fastening said ring 66.

In operation, the material is inserted in the recessed portion between the movable blade member 54 and the fixed blade member 63 and the machine is advanced by one nibbling operation by a distance corresponding to the nibbling pitch per one nibbling operation.

When it is required to turn the shearing direction to the forward direction of the operator from the direction as shown in FIG. 1, the piston holding member 6 is turned to the front by loosening the ring 66.

The piston holding member 6 rotates conjointly with the movable blade member 54 since said movable blade member 54 is in an eccentric relation with the piston 5 and the thin rod 52 is rotatably fitted in the holder 4.

In this context, the piston holding member 6 may be kept in a fixed position with reference to the machine body through the engagement between the pin of the machine body and the concavity of the piston holding member 6.

Figure 4:
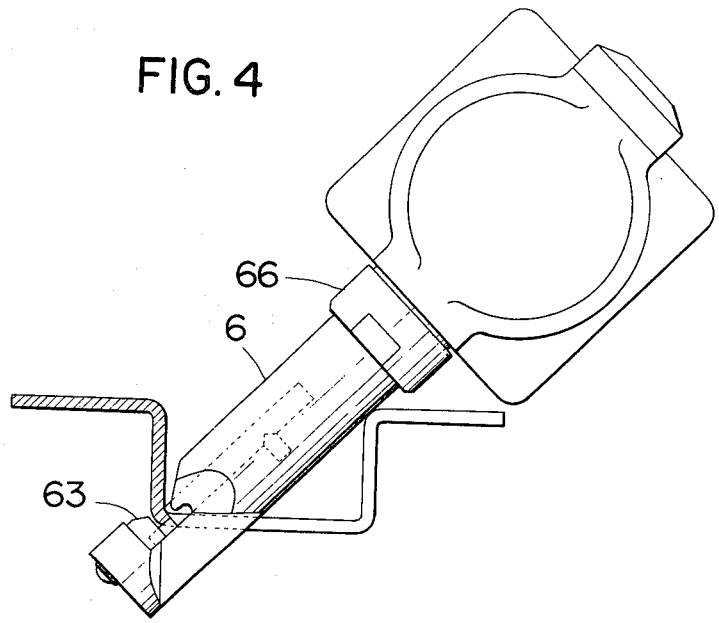
FIG. 4 is an explanatory view showing the nibbling machine of the present invention in use for cutting a keystone plate.
Figure 5A:
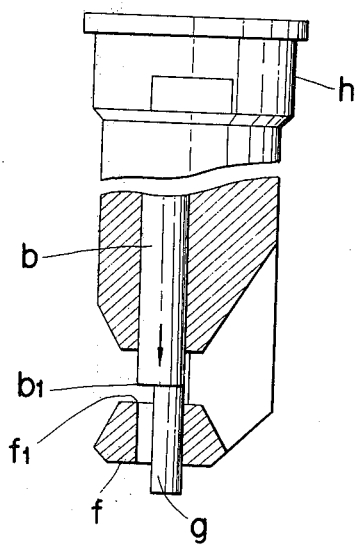
FIG. 5A and 5B show the shearing portions of the nibbling machine according to the present invention.
Figure 5B:
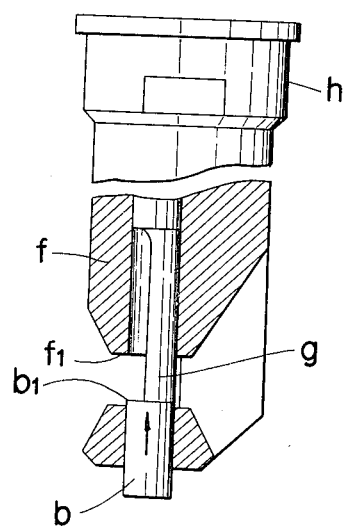

In case a keystone plate or the like is required to be cut, the shearing must be effected at right angles with the direction of the machine body so that the machine body may not strike against the corners of the material as shown in FIG. 4. Accordingly, the ring 66 is once loosened and the piston holding member 6 is turned to a desired direction for this purpose. In this case, the clearance formed between the fixtures of the movable and fixed blade members effectively serves to receive and hold the material in a right position without striking of the machine and the material against each other, allowing easy operation of the machine.

What is claimed is:

1. A hand nibbling machine comprising: a casing; rotary driving means in said casing; a piston and means drivingly connecting said piston with said rotary driving means so that rotation of said rotary driving means effects reciprocation of said piston while permitting rotation of said piston about its longitudinal axis relative to said rotary driving means; a reciprocable blade member fixed to said piston and having a first cutting edge, said reciprocable blade member having a recessed portion for receiving therein the material to be cut with said first cutting edge being provided at one of the ends of said recessed portion; means defining a fixed blade member having a second cutting edge disposed in abuttable relation to said first cutting edge; a piston holding member surrounding said piston for guiding movement of said piston, and means mounting said piston holding member and said reciprocable blade member for arcuate movement about the longitudinal axis of said piston relative to said casing; a base member having an end opposed to and spaced from one end of said piston holding member to define therebetween a slot for receiving the material to be cut, said reciprocable blade member being reciprocable through said slot, one of said piston holding member and said base member providing said fixed blade member and the other of said piston holding member and said base member providing a guide for said reciprocable blade member, the opposing ends of said piston holding member and said base member flaring away from each other in a direction outwardly from said reciprocable blade member so that said slot progressively enlarges in a direction outwardly from said reciprocable blade member; a support member extending between and fixedly connecting the opposing ends of said piston holding member and said base member, said support member being provided on the rear side of the reciprocable blade member with reference to the cutting direction of the machine and extending in parallel with said reciprocable blade member, said support member having a thickness the same as or less than the thickness of said reciprocable blade member and having a sectoral shape diverging from adjacent said reciprocable blade member in the outward direction.

2. A hand nibbling machine as set forth in claim 1, wherein said recessed portion is defined by a lower end surface of the reciprocable blade member and a pin provided eccentrically on said end surface and slidably supported by the fixed blade member.

3. A hand nibbling machine as set forth in claim 1, wherein said means for connecting said piston with said rotary driving means for transmitting a force from said rotary driving means for effecting reciprocation of said piston while allowing rotation of said piston about its axis is formed in combination of an eccentric shaft adapted to be rotated by the rotary driving means, a slide member with a central hole for receiving said eccentric shaft, a holder having upper and lower sliding guides defining a space to slidably hold said slide member therein and a groove extending in the axial direction and a rod connected to the piston and adapted to be fitted in said groove of the holder.

4. A hand nibbling machine as set forth in claim 1, wherein said means for connecting said piston with said rotary driving means for transmitting a force from said rotary driving means for effecting reciprocation of said piston while allowing rotation of said piston about its axis is formed in combination of an eccentric shaft adapted to be rotated by the rotary driving means, an eccentric rotary member with an eccentric pin, a holder having a hole for receiving said eccentric pin and a groove extending axially and a thin rod connected to the piston and adapted to be fitted in said groove.

* * * * *